(12) United States Patent
Kreitzer

(10) Patent No.: US 10,787,317 B2
(45) Date of Patent: Sep. 29, 2020

(54) STRAP FOR LIFTING WATER-HEATER

(71) Applicant: Scott Kreitzer, Fuquay Varina, NC (US)

(72) Inventor: Scott Kreitzer, Fuquay Varina, NC (US)

( * ) Notice: Subject to any disclaimer, the term of this patent is extended or adjusted under 35 U.S.C. 154(b) by 49 days.

(21) Appl. No.: 16/161,696

(22) Filed: Oct. 16, 2018

(65) Prior Publication Data
US 2020/0115162 A1    Apr. 16, 2020

(51) Int. Cl.
*B65G 7/12* (2006.01)
*A45F 3/14* (2006.01)

(52) U.S. Cl.
CPC .......... *B65G 7/12* (2013.01); *A45F 2003/142* (2013.01)

(58) Field of Classification Search
CPC . B66F 11/00; B66F 15/00; B65G 7/12; A45F 2003/142
See application file for complete search history.

(56) References Cited

U.S. PATENT DOCUMENTS

| | | | | |
|---|---|---|---|---|
| 3,424,134 A * | 1/1969 | Rosenblum | ........ | A62B 35/0018 182/3 |
| 4,116,374 A * | 9/1978 | Garello | ........ | B65D 25/22 215/396 |
| 4,553,633 A * | 11/1985 | Armstrong | ........ | A62B 35/0037 119/857 |
| 4,575,874 A * | 3/1986 | Johnson | ........ | A41F 15/007 2/460 |
| 4,600,134 A * | 7/1986 | Colby | ........ | A45F 3/04 224/260 |
| 4,834,438 A * | 5/1989 | Haidet | ........ | A45F 5/10 294/151 |
| 5,531,495 A * | 7/1996 | Hohman | ........ | B65D 25/2817 294/165 |
| 5,927,574 A * | 7/1999 | Ruesink | ........ | F41C 33/003 224/149 |
| 6,254,052 B1 * | 7/2001 | Hubbard | ........ | F24H 9/06 248/225.11 |
| 7,281,701 B1 * | 10/2007 | Huang | ........ | B60P 7/083 24/69 CT |
| 7,353,779 B2 * | 4/2008 | Altieri | ........ | A01K 1/029 119/770 |
| 9,010,824 B2 * | 4/2015 | Hayes | ........ | B65G 7/12 294/150 |
| 9,084,470 B1 * | 7/2015 | Huck | ........ | A45F 3/14 |
| 9,155,374 B2 * | 10/2015 | Kacmarcik | ........ | A45F 3/14 |
| D758,689 S * | 6/2016 | Coyle | ........ | D23/206 |
| 9,642,444 B2 * | 5/2017 | Krol | ........ | A45F 3/14 |
| 2002/0067983 A1 * | 6/2002 | McGill | ........ | B66F 9/06 414/634 |
| 2003/0127479 A1 * | 7/2003 | Giggleman | ........ | A45F 3/14 224/260 |

(Continued)

*Primary Examiner* — Brian D Nash
(74) *Attorney, Agent, or Firm* — NK Patent Law

(57) ABSTRACT

Device for lifting a water heater includes a strap configured to loop around a vertical cross-section of the water heater. Handles extending from opposing sides of the strap when the strap is looped around the water heater are provided along with a plurality of selectively placeable cushions configured to be positioned between the strap and corners of the water heater. The device further includes a ratchet attached to the strap, the ratchet configured to tighten the strap looped around the water heater.

18 Claims, 4 Drawing Sheets

(56) References Cited

U.S. PATENT DOCUMENTS

| | | | | |
|---|---|---|---|---|
| 2003/0160078 | A1* | 8/2003 | Godshaw | A45F 3/14 |
| | | | | 224/607 |
| 2004/0076501 | A1* | 4/2004 | McGill | B66F 9/082 |
| | | | | 414/607 |
| 2004/0238586 | A1* | 12/2004 | Godshaw | A45F 5/00 |
| | | | | 224/625 |
| 2005/0121568 | A1* | 6/2005 | Youngberg | F24H 9/06 |
| | | | | 248/154 |
| 2005/0194804 | A1* | 9/2005 | Isaacson, Jr. | B65G 7/12 |
| | | | | 294/152 |
| 2006/0021201 | A1* | 2/2006 | Brown | A44B 11/06 |
| | | | | 24/298 |
| 2006/0055191 | A1* | 3/2006 | Isaacson, Jr. | B65G 7/12 |
| | | | | 294/152 |
| 2008/0017135 | A1* | 1/2008 | Broadway | F24H 9/02 |
| | | | | 122/19.2 |
| 2008/0149048 | A1* | 6/2008 | Ostler | F22B 37/24 |
| | | | | 122/510 |
| 2009/0169136 | A1* | 7/2009 | Kenney | F24H 1/06 |
| | | | | 383/105 |
| 2014/0001221 | A1* | 1/2014 | McDonald | A45F 3/14 |
| | | | | 224/637 |
| 2015/0076430 | A1* | 3/2015 | Gans | B66F 11/00 |
| | | | | 254/8 R |
| 2018/0251143 | A1* | 9/2018 | Benton | B62B 3/008 |
| 2019/0110581 | A1* | 4/2019 | Cohen | B05B 15/60 |

* cited by examiner

STRAP FOR LIFTING WATER-HEATER

TECHNICAL FIELD

This disclosure is related to a tool for lifting and moving bulky items, and, more particularly, to a tool for lifting and moving cylindrical tanks, such as water heaters and similar other bulky items.

BACKGROUND

Various types of water heaters are used in domestic, commercial and industrial settings for heating water. Installation of a water heater of less than 100 gallon capacity, for example, is typically handled by a single individual such as a steamfitter, a plumber, or a HVAC technician. While the water heater to be newly installed can be carted in a hand truck across the floor of an attic or a basement to the location where the water heater is to be installed, if there is an obstacle on the floor such as a girder, a beam, a joist, a pipe, an electrical conduit, or a similar other obstacle, the hand truck may not be suitable for elevating the water heater a significant distance off the ground as would be necessary to get the water heater over such an obstacle. For example, in the case where the obstacle is a refrigerant carrying pipe/conduit running across the path being traversed by the hand truck carrying the water heater, rolling the hand truck carrying the water heater over the refrigerant carrying pipe/conduit may result in damage to the pipe/conduit whereby an undesirable leak may be the result. Further, regulations may require water heaters to be installed at a certain height above floor level. For example, a water heater weighing up to 250 lbs. being installed within a garage of a residential home or within the utility room of a commercial facility may have be lifted to a height of anywhere between 9 inches and several feet off the ground and onto a raised platform on which the water heater is to be installed. However, due to the large diameter of the water heater, it may be difficult for a person to wrap the person's arms around the water heater in order to lift the water heater over such an obstacle.

Accordingly, a need exists for a method or solution that addresses these disadvantages and difficulties associated with elevating water heaters and similar other bulky articles over and across obstacles and further to lift such articles onto raised platforms.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a device for lifting a water heater comprising a strap configured to loop around a vertical cross-section of the water heater; handles extending from opposing sides of the strap when the strap is looped around the water heater; a plurality of selectively placeable cushions configured to be positioned between the strap and corners of the water heater; and a ratchet attached to the strap, the ratchet configured to tighten the strap looped around the water heater.

According to one or more embodiments, the handles are removably attached to the strap.

According to one or more embodiments, each handle is provided with a fastening mechanism for securing to one or more metal-lined openings provided on the strap.

According to one or more embodiments, each handle is provided with a hook for removably engaging a metal-lined slit provided on the strap.

According to one or more embodiments, each handle comprises a belt that defines metal-lined holes for engaging a buckle on the strap for removably attaching handle to the strap.

According to one or more embodiments, each handle is provided with an interlocking bar, the interlocking bar configured for sliding through an opening on the strap and turning such that the interlocking bar is parallel to a strap surface for interlocking handle to the strap.

According to one or more embodiments, the handles are fixedly attached to the strap.

According to one or more embodiments, the cushions comprise sleeves that slide about the strap.

According to one or more embodiments, the ratchet further includes a ratchet cushion located on a water heater facing side of the ratchet.

According to one or more embodiments, the device further comprises a flue collar engaging cushion between two adjacent cushions for engaging a flue collar of the water heater.

According to one or more embodiments, the strap has a width of between approximately 1 inch and approximately 4 inches.

According to one or more embodiments, the strap is made of a non-abrasive material.

According to one or more embodiments, the strap is made of one or more of: kevlar, carbon fiber, polypropylene, polyethylene, and nylon.

According to one or more embodiments, each handle is positioned between two adjacent cushions.

Disclosed herein is a device for lifting an article, comprising a strap that has a selectable length to loop around a vertical cross-section of the article; handles extending from opposing sides of the strap when the strap is looped around the article; a plurality of selectively placeable cushions configured to be positioned between the strap and corners of the article; and a ratchet attached to the strap, the ratchet configured to tighten strap looped around the article, wherein a largest horizontal cross-section of the article has a circumference of at least 100 inches.

According to one or more embodiments, the ratchet includes a ratchet cushion located on an article facing side of the ratchet.

According to one or more embodiments, the handles are fixedly attached to the strap.

According to one or more embodiments, the handles are detachable attached to the strap.

According to one or more embodiments, the largest horizontal cross-section of the article approximates a circle, an oval, a rectangle, a square, or a triangle.

According to one or more embodiments, the strap has a width of between approximately 0.5 inches and approximately 6 inches.

Other objects and advantages of this invention will be better appreciated from the following detailed description.

DESCRIPTION OF EMBODIMENTS

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

FIGS. 1-4 illustrate views of a device generally designated numeral 10 ("strap 10") for use with lifting and moving bulky items. The strap 10 as described herein is configured to loop around a vertical cross-section of a bulky article such as water heater 12 shown in FIGS. 1-3.

With the sufficiently thick walls surrounded by insulation, water heaters have a relatively high mass associated therewith. Furthermore, water heaters are usually of a large enough volume. The increased weight and large size of water heaters make lifting them over obstacles difficult. Many water heaters are five to six feet or more in height and to lift such a water heater requires a person to wrap their arms around the water heater. This method of lifting makes it difficult in elevating the water heater a significant distance off of the ground and such a lifting technic may also be unsafe. The strap as described herein provides a convenient solution to such problems. The strap can be advantageously used to lift large and/or bulky articles such as, for example, a water heater, that does not otherwise present an easy way to be lifted/elevated for moving over an obstacle such as a girder, a beam, a joist, a pipe or similar other items running across the floor of a basement or an attic, for example. Further, as noted earlier, a water heater weighing up to 250 lbs. being installed within a garage of a residential home or within the utility room of a commercial facility may have be lifted to a height of anywhere between 9 inches and several feet off the ground and onto a raised platform on which the water heater is to be installed. The strap as described herein advantageously permits the lifting and moving of bulky articles such as water heaters under such circumstances.

Figure 1:
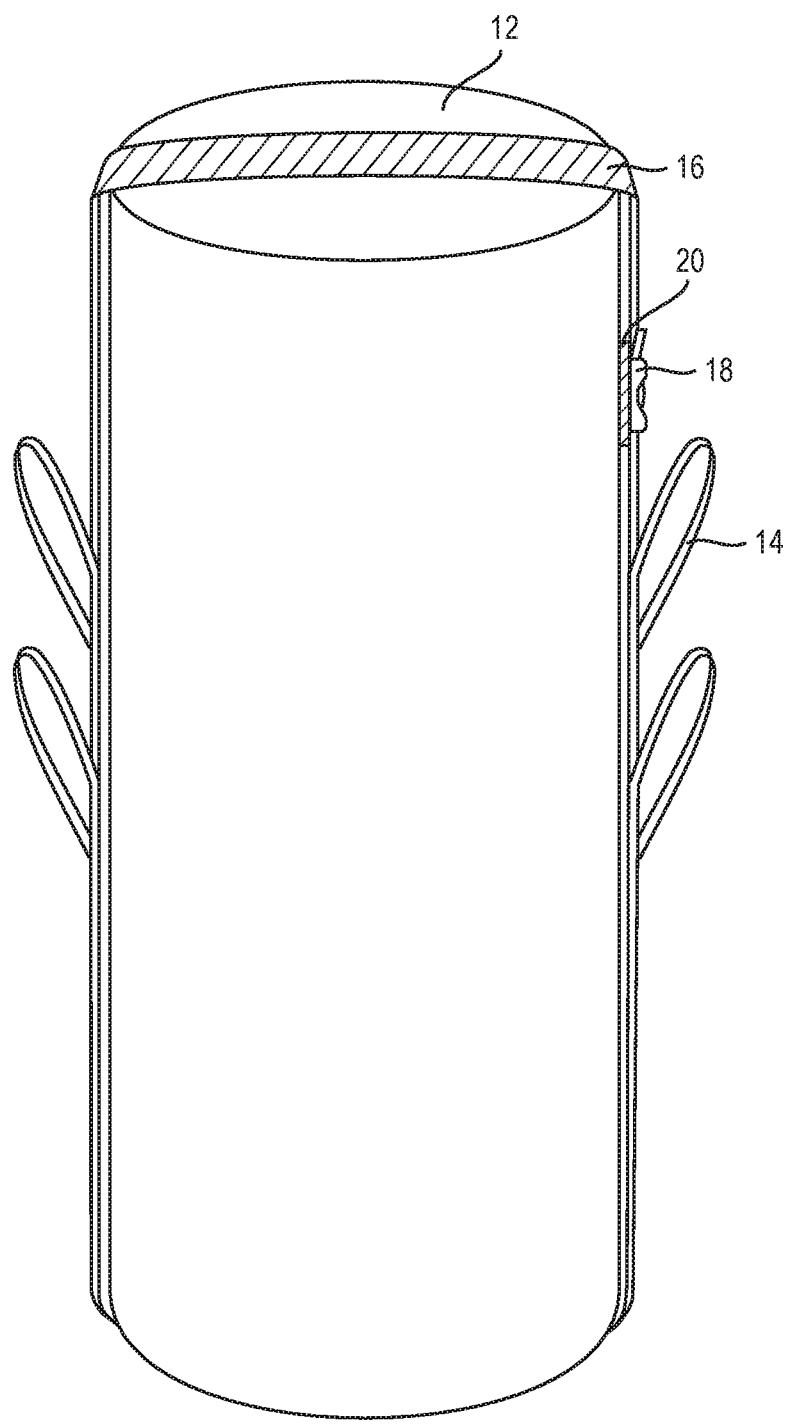
FIG. 1 is a top perspective view of a strap looped around a vertical cross-section of a water heater in accordance with an embodiment of the present invention.
Figure 2:
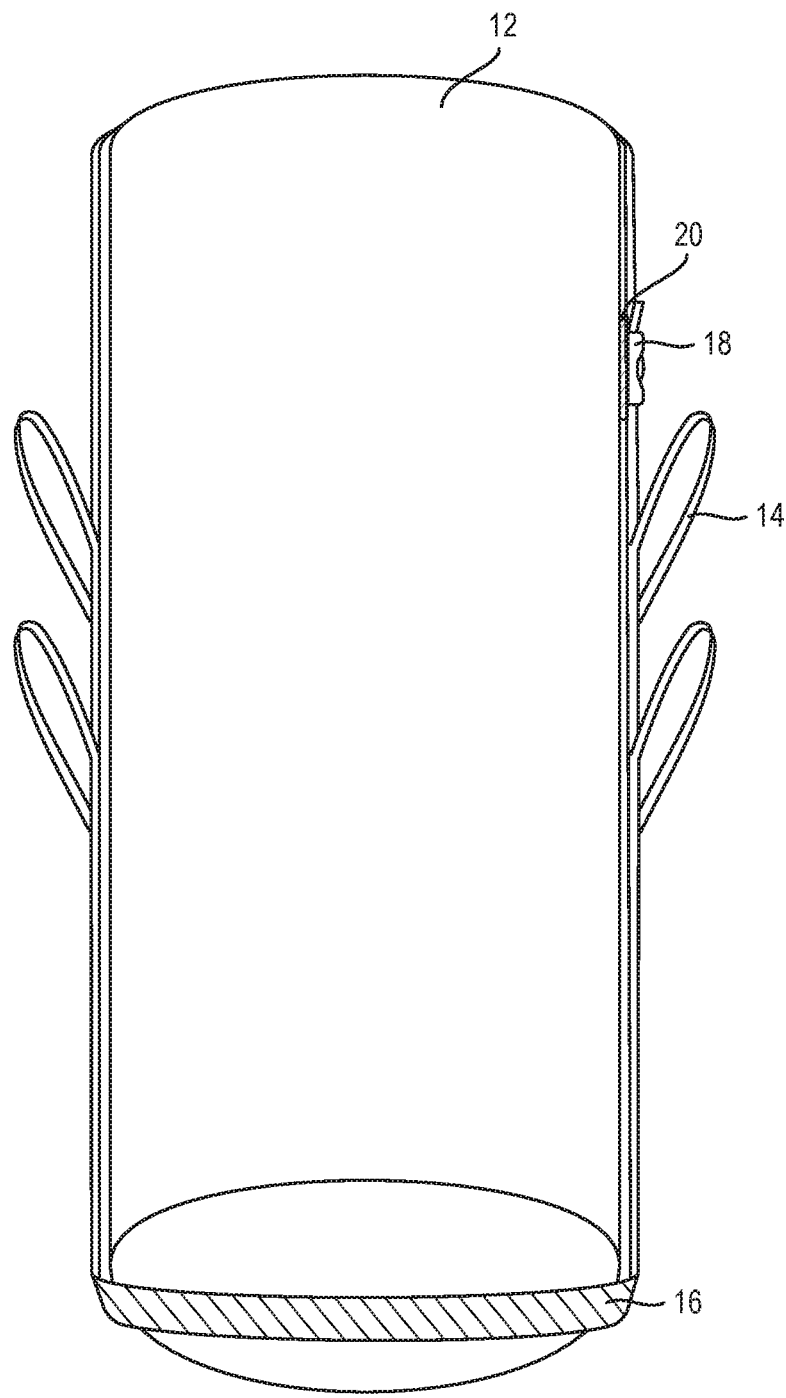
FIG. 2 is a bottom perspective view corresponding to FIG. 1 in accordance with an embodiment of the present invention.
Figure 3:
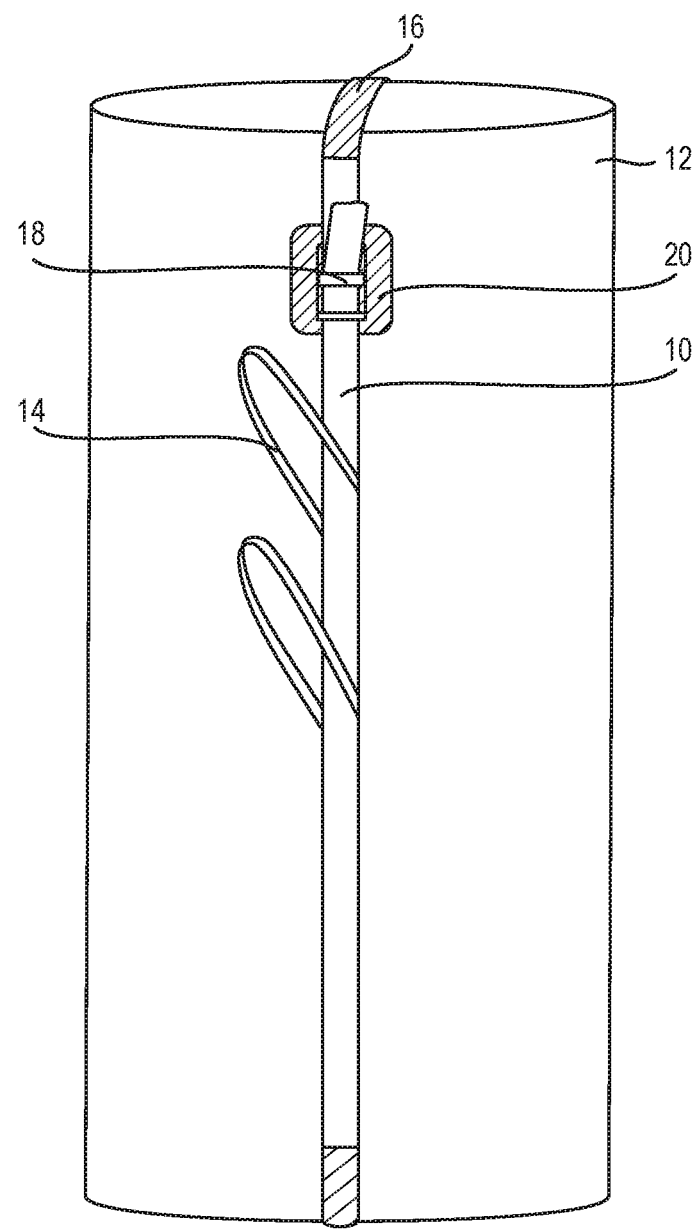
FIG. 3 is a top-side perspective view corresponding to FIG. 1 in accordance with an embodiment of the present invention.
Figure 4:
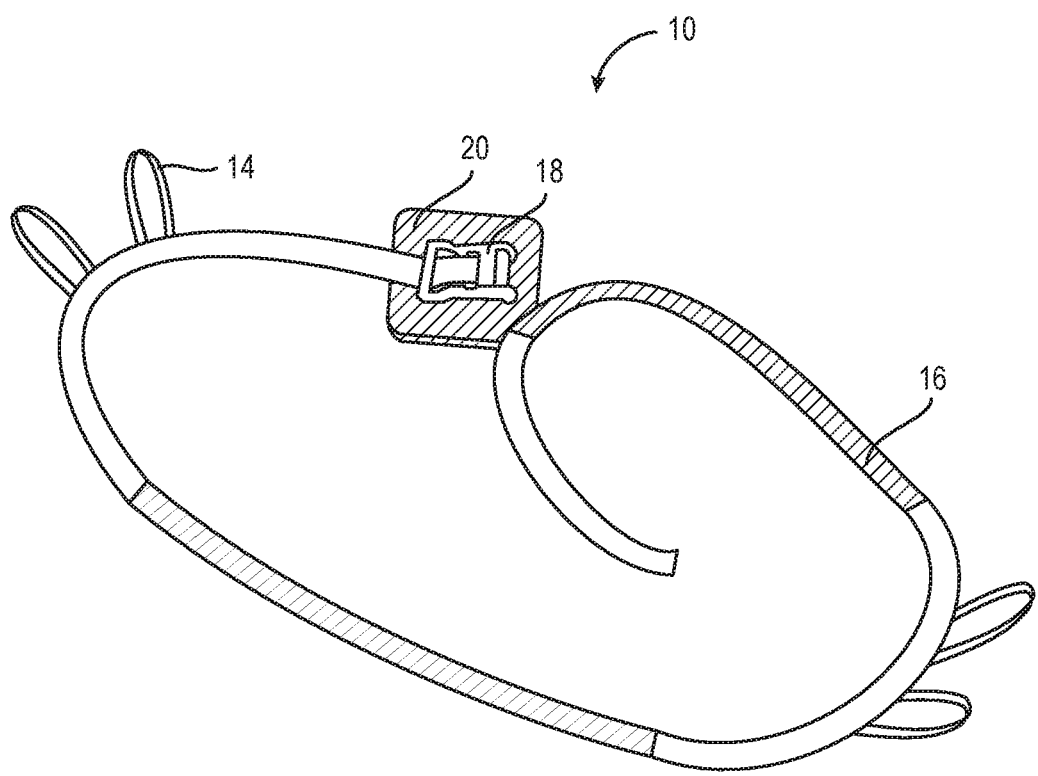
FIG. 4 is a schematic view of a strap configured for looping around a vertical cross-section of a water heater in accordance with an embodiment of the present invention.

As shown in FIG. 4, strap 10 includes a loop of material whose length generally approximates the vertical cross-section of an elongate cylinder, such as a water heater 12, as illustrated in FIG. 1. FIGS. 1-3 shows strap 10 looped around a water heater 12. The strap 10 may be made of a material that allows for the forming of a generally conforming loop around the water heater. The strap 10 may be made of Kevlar, carbon fiber, polypropylene, polyethylene, nylon, or similar other materials. In one embodiment, the strap material is made of a non-abrasive material such that the strap may not cause scratches, dents or similar other damage to a water heater being lifted during the lifting of the water heater using the strap as described herein.

In various embodiments, strap 10 includes handles 14 extending from opposing sides of strap 10 when the strap is looped around water heater 12, as shown in FIG. 2 for example. While a total of four handles are shown in FIG. 2, the total may vary between 2 and potentially any even number greater than 2, the number of handles, as well as the positioning of each of the handles, are determined based on factors such as the height of the lifter, the distribution of weight within the article being lifted (e.g., the water heater being lifted), the height of the article, and the space available between adjacent cushions, and similar other factors. In all embodiments, a total of two handles (one on each side) is provided as a minimum.

The strap 10 further includes a ratchet 18 attached to the strap, the ratchet configured to tighten the strap after the strap is looped around the water heater. The ratchet 18 may include a handle or similar other mechanism that facilitates the tightening of strap after the strap is looped around the vertical cross-section of a water heater; such tightening prevents or minimizes the potential of the strap slipping off the water heater while the water heater is being lifted with the strap. In some embodiments, the ratchet 18 also includes a ratchet cushion 20 located on a water heater facing side of the ratchet to prevent or minimize damage to the water heater in the form of dents or scratches to the water heater surface.

The strap 10 further includes a plurality of selectively placeable cushions 16 configured to be positioned between the strap 10 and corners of the water heater. In one embodiment, the strap includes two cushions 16—a first cushion provided for securing an upper portion of the water heater (as shown in FIG. 1, for example) and a second cushion for securing a lower portion of the water heater (as shown in FIG. 2, for example). In one embodiment, the handles 14 are positioned between two adjacent cushions. In one embodiment, the cushions comprise sleeves that slide about the strap; this advantageously permits the sliding of a cushion to adjust its location along the strap such that it can be appropriately positioned to protect the corners of the water heater; FIG. 1 illustrates such a cushion configured as a sleeve that can be adjusted along the length of the strap.

In some embodiments, the cushions may be removably attached to strap surface through a Velcro® type of arrangement so that each cushion may be moved as needed to adjust its location such that it is properly positioned to protect the corners and any other aspects of the article being lifted that requires additional protection. To elaborate, the strap may be provided with a "male" side of a Velcro® set whereas the cushions may be provided with a "female" side of the Velcro® set that compliments the "male" side on the strap, or vice versa. This may conveniently permit the cushions to be positioned at a convenient location along a span of the strap depending on the specific protection needs associated with the article being lifted.

In some embodiments, the strap 10 further includes a flue collar engaging cushion (not shown) between two adjacent cushions 16 for engaging a flue collar of the water heater. As is well-known in the art, water heaters that burn natural gas, propane or oil typically include a flue collar for exhausting the flue gas, which is a by-product of burning natural gas, propane or oil. This flue collar engaging cushion may advantageously protect the flue collar on water heaters including a flue caller from deformation that may otherwise result from the stress created when the water heater is being lifted by the strap handles. In various embodiments, the thickness and profile of the flue collar engaging cushion are configured for preventing the deformation of the flue gas collar during the lifting of the water heater.

In some embodiments, the handles are fixedly attached to the strap. This may be accomplished by stitching of the handle to the strap. In some embodiments, the permanent affixation of the handle may be accomplished through molding technics. In further embodiments, the permanent affixation may be accomplished by riveting the handle to the strap, or using similar other technics for permanently affixing the handles to the strap.

In some embodiments, the handles 14 are removably attached to the strap. In one embodiment, this may be accomplished by providing each handle with a fastening mechanism for securing the handle to one or more metal-lined openings provided on the strap. In another embodiment, this may be accomplished by providing each handle with a hook for removably engaging a metal-lined slit provided on the strap. In a further embodiment, each handle includes a belt that defines metal-lined holes for engaging a buckle provided on the strap for removably attaching the handle to the strap. In a furthermore embodiment, each handle may be provided with an interlocking bar, the interlocking bar configured for sliding through an opening on the strap and turning such that the interlocking bar is parallel to a strap surface for interlocking the handle to the strap.

While the strap invention as mentioned herein is described with respect to the lifting of a water heater, the inventor(s) envision the strap being used in the lifting of any bulky article. The term "bulky" as used herein refers to an article whose largest horizontal cross-section has a circumference of at least 100 inches. The average arm span or reach (sometimes referred to as wingspan) is the physical measurement of the length from one end of an individual's arms (measured at the fingertips) to the other when raised parallel to the ground at shoulder height at a 90° angle. The average reach correlates to the person's height. For example, a 5'6" person will have an arm span of about 66", plus or minus an inch or two. So, for an article with the largest horizontal cross-section having a circumference of at least 100 inches, the arm span would typically have to reach at least 50 inches (i.e., half the largest horizontal cross-section) in order to be able to hold the handles on the strap as described herein to lift the article. For an article having a largest horizontal cross-section of the article has a circumference of at least 100 inches, it may be difficult for a person to wrap the arms around the article in order to lift the article over an obstacle such as a girder, a beam, a joist, a pipe or similar other items running across the floor of a basement or an attic, for example. Accordingly, the strap as described herein can be conveniently used to lift such a large and/or bulky article (i.e., an article having a largest horizontal cross-section of the article has a circumference of at least 100 inches) that does not otherwise present an easy way to be lifted for moving over short distances, for example, of a few feet. For example, hand trucks may not be suitable for lifting such a bulky article over a girder or a pipe running across the floor of a basement or an attic, as noted earlier, and the strap as described herein may be conveniently used to lift such bulky articles. The strap can advantageously be used for lifting a bulky article whose largest horizontal cross-section approximates a circle, an oval, a rectangle, a square, or a triangle. In various embodiments, the strap for lifting bulky articles may have a width of between approximately 0.5 inches and approximately 6 inches. Accordingly, the present invention provides a durable strap for lifting other bulky articles, besides water heaters.

In operation, the lifting of a water heater with the strap may proceed as follows. The strap can quickly be attached to an article that needs to be lifted such as, for example, a water heater by looping the strap around a vertical cross-section of the water heater. Following this, the strap may be tightened by the ratchet to make the loop formed by the loop taut and tight so that the strap is in frictionally gripping engagement with the exterior of the water heater. After the ratcheting step, the tight strap encircles the vertical cross-section of the water heater to be lifted such that inadvertent movement out of the hold of the strap is prevented by the tightness provided by the ratchet after the strap is looped around the vertical cross-section of the water heater. Further, the ratchet also conveniently provides for a quick release after the article is placed upon a support surface.

After the strap is tightened using the ratchet, the handle on the strap can then be manually grasped and the water heater lifted over the obstacle(s). After the water heater is transported over the obstacle, the water heater is placed on the floor and the ratchet is relieved, which permits the frictionally gripping engagement with the exterior of the water heater to be released and allow the strap to be expeditiously removed from the water heater.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device for lifting a water heater, comprising:
   a strap configured to loop around a vertical cross-section of the water heater;

handles extending from opposing sides of the strap when the strap is looped around the water heater;

a plurality of selectively placeable cushions configured to be positioned between the strap and corners of the water heater; and a ratchet attached to the strap, the ratchet configured to tighten the strap looped around the water heater, the ratchet spaced apart from the handles, wherein the ratchet includes a ratchet cushion located on a water heater facing side of the ratchet.

2. The device of claim 1, wherein the handles are removably attached to the strap.

3. The device of claim 2, wherein each handle is provided with a fastening mechanism for securing to one or more metal-lined openings provided on the strap.

4. The device of claim 2, wherein each handle is provided with a hook for removably engaging a metal-lined slit provided on the strap.

5. The device of claim 2, wherein each handle comprises a belt that defines metal-lined holes for engaging a buckle on the strap for removably attaching handle to the strap.

6. The device of claim 2, wherein each handle is provided with an interlocking bar, the interlocking bar configured for sliding through an opening on the strap and turning such that the interlocking bar is parallel to a strap surface for interlocking handle to the strap.

7. The device of claim 1, wherein the handles are fixedly attached to the strap.

8. The device of claim 1, further comprising a flue collar engaging cushion between two adjacent cushions for engaging a flue collar of the water heater.

9. The device of claim 1, wherein the strap has a width of between approximately 1 inch and approximately 4 inches.

10. The device of claim 1, wherein the strap is made of a non-abrasive material.

11. The device of claim 1, wherein the strap is made of one or more of: kevlar, carbon fiber, polypropylene, polyethylene, and nylon.

12. The device of claim 1, wherein each handle is positioned between two adjacent cushions.

13. The device of claim 1, wherein the strap has a width of between approximately 0.5 inches and approximately 6 inches.

14. A device for lifting a water heater, comprising:

a strap configured to loop around a vertical cross-section of the water heater;

handles extending from opposing sides of the strap when the strap is looped around the water heater;

a plurality of selectively placeable cushions configured to be positioned between the strap and corners of the water heater; and a ratchet attached to the strap, the ratchet configured to tighten the strap looped around the water heater, wherein the cushions comprise sleeves that slide about the strap, and wherein the ratchet includes a ratchet cushion located on a water heater facing side of the ratchet.

15. A device for lifting an article, comprising:

a strap that has a selectable length to loop around a vertical cross-section of the article;

handles extending from opposing sides of the strap when the strap is looped around the article;

a plurality of selectively placeable cushions configured to be positioned between the strap and corners of the article; and a ratchet attached to the strap, the ratchet configured to tighten strap looped around the article, the ratchet spaced apart from the handles, wherein a largest horizontal cross-section of the article has a circumference of at least 100 inches, and wherein the ratchet includes a ratchet cushion located on an article facing side of the ratchet.

16. The device of claim 15, wherein the handles are fixedly attached to the strap.

17. The device of claim 15, wherein the handles are detachable attached to the strap.

18. The device of claim 15, wherein the largest horizontal cross-section of the article approximates a circle, an oval, a rectangle, a square, or a triangle.

* * * * *